UNITED STATES PATENT OFFICE 2,571,360

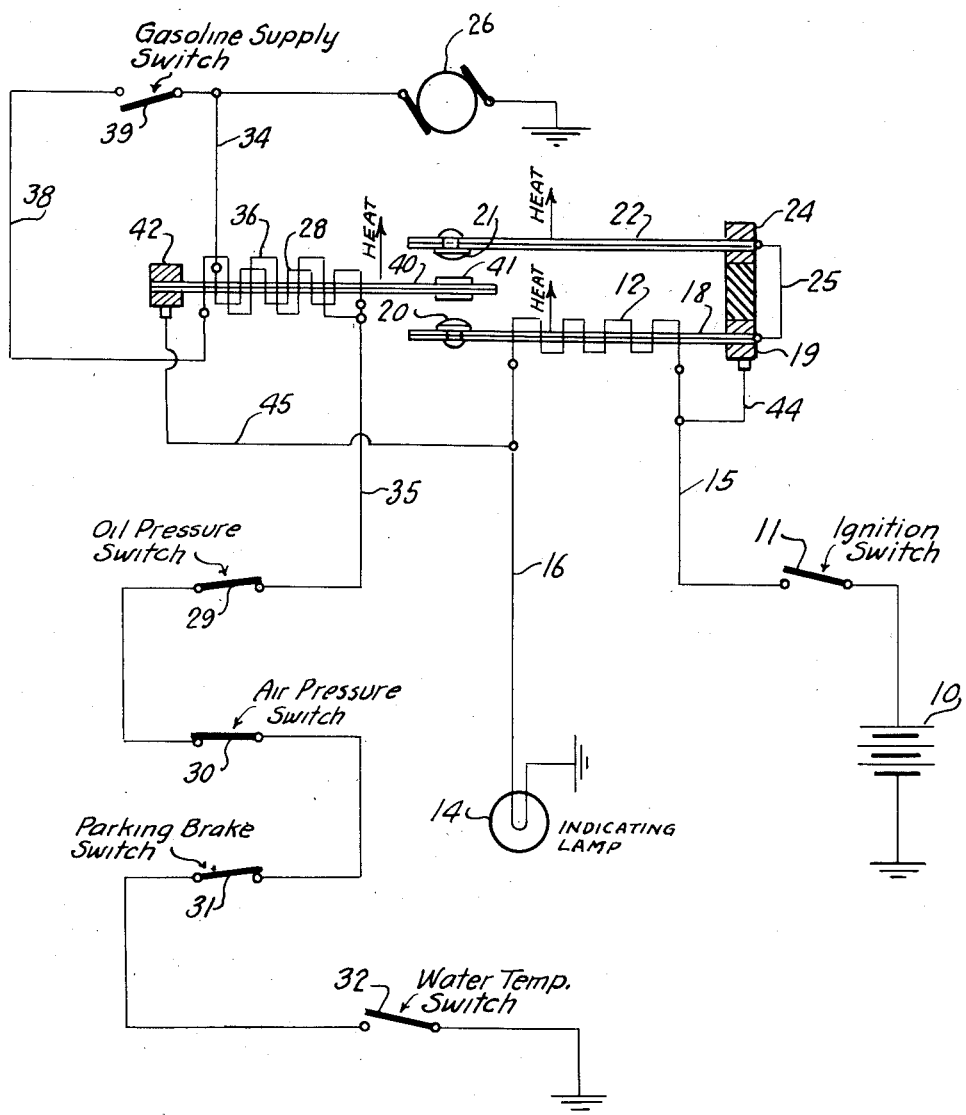

ELECTRICAL MONITORING SYSTEM

Theodore W. Hallerberg, Chicago, Ill.

Application February 6, 1950, Serial No. 142,612

5 Claims. (Cl. 177—311)

This invention relates to an electrical monitoring system and particularly to such a system wherein a single indicator selectively distinguishes between groups or sets of conditions.

In order to illustrate the present invention, reference may be made to the operation of an ordinary automobile. Certain conditions of operation may be termed critical, such as oil pressure, air pressure for the braking system, water temperature, etc. Other conditions may be considered dangerous, but are not critical, such as a low fuel supply. It is highly advantageous to signal the various changes in operating conditions during the operation of a car by means of a single indicating device since a multiplicity of indicating devices tends to confuse rather than inform. It is further desirable to employ different signals for indicating the onset of critical conditions from those used to indicate dangerous but non-critical conditions.

It is an object of this invention, therefore, to provide an electrical monitoring system wherein a single indicator selectively distinguishes between groups or sets of conditions.

Another object of this invention is to provide a compact, low cost electrical indicating device wherein critical signals always supersede the non-critical signals.

A further object of this invention is to provide an electrical monitoring system in which different signals are given to show that the indicating device itself is functioning, that a critical condition has arisen or that a non-critical but dangerous condition has arisen.

Other objects and advantages of the invention will become apparent from the following detailed description thereof when read in conjunction with the accompanying drawing in which the single figure comprises a circuit diagram of one preferred embodiment of the present invention.

The accompanying drawing discloses an embodiment of the invention as applied to the operation of an automobile. A battery 10 provides a power source which is in circuit with an ignition switch 11, a resistance heating coil 12 and an indicating lamp 14. A conductor 15 connects the ignition switch 11 to the heating coil 12, and a conductor 16 connects the ground side of the heating coil 12 to the indicating lamp 14.

A thermally deformable metal member shown in the drawings has a bimetallic element 18 which is stationarily positioned at base 19. A contact 20 is positioned in the free end of element 18 and a second contact 21 is positioned upon a bimetallic element 22 in opposed relationship to the contact 20. The element 22 is likewise stationarily positioned at one end in a base 24 and connected to the element 18 by a conductor 25. By positioning contact 21 on a second bimetallic element 22 the spacing between contacts 20 and 21 remains constant regardless of the ambient temperatures encountered.

The circuit for the condition sensitive devices may include as its power source a generator 26 normally operated by the engine of the automobile. A resistance heating coil 28 and switches 29, 30, 31 and 32 are connected in series with the generator 26 by means of conductors 34 and 35. As shown on the drawings, switch 29 is sensitive to the condition of the oil pressure, and is normally closed when the oil pressure falls within a non-critical range. Similarly the air pressure switch 30, parking brake switch 31 and water temperature switch 32 are normally closed when the conditions monitored thereby are satisfactory.

A third heating coil 36 is connected in parallel with coil 28 by means of a conductor 38. A switch 39, which in this particular embodiment is sensitive to the gasoline supply condition, is in series only with the coil 36 and is normally open when the gasoline supply is adequate.

A bimetallic member 40 is shown surrounded by the coils 28 and 36 so as to be heated by either one or both of these coils. It will be noted that bimetallic elements 18, 22 and 40 are so positioned as to be deformed in the same direction when heated. A double sided contact 41 is positioned upon one end of the element 30 while the other end of the element is held stationary in a base 42. The contact 41 is so located that it moves back and forth between contacts 21 and 20.

A conductor 44 connects the body of bimetallic element 18 and 22 with the battery 10 through the conductor 15, while a conductor 45 grounds the bimetallic element 40 through the conductor 16 and indicating lamp 14. Consequently, a circuit of low resistance is established around coil 12 when contact 41 closes with either contacts 20 or 21.

Operation of the device shown in the drawings is initiated by closing the ignition switch 11, at which time the coil 12 becomes heated and the indicating lamp 14 glows dimly since the resistance of the coil is in series with the lamp. The heat generated in the coil 12 causes the bimetallic element 18 to move the contact 20 upwardly. If the engine is not started so that the generator 26 is put into operation soon after the ignition switch closes, the bimetallic element 18 will so deform as to cause the contact 20 to close with the contact 41. Immediately upon closing of these two contacts, the coil 12 is short circuited and the increased voltage in the circuit causes the indicating lamp to glow brightly. Since coil 12 cools as soon as it is short circuited, element 18 moves downwardly until the contact 20 no longer touches the contact 41, at which point the indicating lamp 14 again glows dimly. In this manner a flashing signal is given by the indicating lamp showing that the ignition switch has been turned on but that the motor is not running. Obviously such an indication can be used to indicate that the ignition switch has been left on inadvertently.

As soon as the engine is started and the generator 26 begins operation, current flows through the conductor 34 to the coil 28 which then becomes heated, assuming all of the switches 29, 30, 31 and 32 are closed indicating normal operating conditions. Since the gasoline supply switch 29 is generally open, the coil 36 is not heated. Under these conditions, the bimetallic element 40 is deformed steadily as is the bimetallic element 18 so that the contacts 41 and 20 tend to follow one another without closing. The contact 21 is so spaced from the contact 41 that the deformation of the element 40 caused by heating the coil 28 alone is not enough to close the contact 41 with the contact 21. Consequently, normal operation of the automobile is indicated by a dull glow in the lamp 14. Whenever any of the critical operating conditions monitored by the switches 29 to 32, inclusive, fall outside a predetermined range, the switch monitoring that particular condition opens stopping the flow of current through the coil 28. When this happens, the cooling of the coil 28 causes the contact 41 to move downwardly and to close with the upwardly positioned contact 20 carried by the still heated bimetallic strip 18. The coil 12 is thus shunted out of the lamp circuit, and bimetal 18 begins to cool. The bright glow of the lamp 14 produced by the short circuiting of the coil 12 returns shortly to a dull glow when the coil 12 has cooled sufficiently to move the contact 20 downwardly from contact 41. Once the contact has been broken, coil 12 again heats the element 18 moving the contact 20 upwardly against the contact 41. As a result the opening of any one of the switches 29 to 32, inclusive, produces a flashing signal in the indicating lamp 14 which indicates the existence of conditions critical to further operation of the automobile.

When the operating conditions of the automobile are otherwise normal and the gasoline supply falls below a minimum, such as two gallons, switch 39 closes and coil 36 becomes heated. The combined heat of coils 36 and 28 is sufficient to move the contact 41 upwardly against the contact 21 and thus to short circuit coil 12. Under these conditions a steady bright light is emitted by the indicating lamp 14. The operator is thus warned that the gasoline supply is low by the display of the constant bright light. After gasoline has been obtained, the switch 39 again opens, the coil 36 cools and the contact 41 moves out of contact with the contact 21 causing lamp 14 to glow dimly once more.

One of the outstanding features of the present invention is that a critical condition is always shown on the indicating lamp 14 whether it occurs before or after a non-critical occurrence. As a specific example, assume that the gasoline supply has dropped below the pre-determined minimum and that the switch 39 has closed to cause contacts 21 and 41 to close. The continuous bright glow emitted by the lamp 14 shows the existence of this non-critical condition. During the drive to the gas station, however, assume that a bad leak develops in the oil line and the oil pressure drops below a safe minimum, so that an engine bearing may burn out if the car is operated further. It is then essential that some signal be given that further operation is highly dangerous. To produce such a signal, the oil pressure switch 29 opens so that both coils 28 and 26 are cooled and the element 40 returns to its normal position. Since the heating of the element 18 is continued, the upwardly deflected contact 20 engages contact 41 intermittently as above described to produce a flashing signal in the lamp 14. Thus it is seen that a critical condition, regardless of when it occurs, is signaled by the lamp 14 by means of intermittent light flashes.

Numerous modifications and variations of the present invention will become apparent to those skilled in the art from the above detailed description thereof. This invention is not, of course, limited to electrical signals for automobiles, since it may be applied wherever the system defined in the claims is applicable. In the drawings the contact 21 is mounted on a separate bimetallic element 22, the advantage being that ambient temperatures do not affect the spacing of contacts 21 and 41. Contact 21, however, may be mounted upon element 18 by bending back a portion of the element 18 so that the contact 21 is mounted in opposed relationship to the contact 20. When such a modification is employed contacts 21 and 41 lock upon closing and a release switch should be provided in the conductor 35. Where ambient temperatures are not likely to affect the apparatus, the contact 21 may be stationarily positioned upon any suitable base as long as it is connected to the element 18. A lamp 14 is shown for providing visual signals, but any indicating device, such as sound signals or other types of visual indicators may be employed. It will be obvious that the number of sensitive switches in the conductor 35 is entirely optional. Coils 12, 28 and 36 are indicated as surrounding their respective elements, but the heating coils and the bimetallic elements may be associated in any manner whereby the heat of the coils is transferred to the bimetallic elements to deform them. Two separate power sources, battery 10 and generator 26, are shown in the accompanying drawings, and this particular arrangement has the advantage of making the system sensitive to the operation of the generator which is a critical feature of the operation of an automobile. It will be apparent, however, that the electrical indicating system will operate from a single source of power as well as from two separate sources of power.

The present invention has been above described in detail, and it will be apparent from this detailed description that the present invention provides an electrical monitoring system wherein a single indicator selectively distinguishes between groups or sets of conditions. Furthermore, one group of conditions can be made to predominate the other group or groups so that the occurrence of any one of the chosen group of conditions will be signaled in preference to the occurrence of other conditions. Each of the elements in the present invention cooperates in producing ultimate signals, so that indicators comprising the present invention may be economically produced in compact form.

What is claimed is:

1. An electrical system for indicating a variety of conditions which comprises a circuit including a source of power, a resistance heating coil and an indicator element, a second circuit connected to a power source including a second heating coil and a condition sensitive device, a third resistance heating coil in parallel with the second coil in said second circuit, a second condition sensitive device in series only with the third resistance coil, a thermally deformable metal member associated with the first coil so as to be heated thereby, a second thermally deformable metal member associated with the second and the third coils so as to be heated by either or both of said coils and deflected in the same general direction upon heating as said first member, connections including contacts on each of said thermally deformable member for short circuiting the first coil by closing the contacts when only the circuit including the first coil is closed, and a third contact electrically connected to the first thermally deformable member to short circuit the first coil upon closing with the contact on the second thermally deformable member when the circuits including the second and third coils are both closed.

2. An electrical system for indicating a variety of conditions which comprises a circuit including a source of power, a resistance heating coil and an indicator element, a second circuit connected to a power source including a second heating coil and a condition sensitive device, a third resistance heating coil in parallel with the second coil in said second circuit, a second condition sensitive device in series only with the third resistance coil, a bimetallic element associated with the first coil so as to be heated thereby, a second bimetallic element associated with the second and third coils so as to be heated by either or both of said coils and deflected in the same general direction upon heating as said first element, connections including contacts on each of said bimetallic elements for short circuiting the first coil by closing the contacts when only the circuit including the first coil is closed, and a third contact mounted upon a bimetallic element so as to be spaced from the contact on the second bimetallic element a predetermined distance regardless of the ambient temperature, said third contact being electrically connected to the first bimetallic element to short circuit the first coil upon closing with the contact on the second bimetallic element when the circuits including the second and third coils are closed.

3. An electrical system for indicating a variety of conditions which comprises a circuit including a source of power, a resistance heating coil and an indicator element, a second circuit connected to a power source including a second heating coil and a condition sensitive device, a third resistance heating coil in parallel with the second coil in said second circuit, a second condition sensitive device in series only with the third resistance coil, a bimetallic element associated with the first coil so as to be heated thereby, a second bimetallic element associated with the second and third coils so as to be heated by either or both of said coils and deflected in the same general direction upon heating as said first element, connections including contacts on each of said bimetallic elements for short circuiting the first coil by closing the contacts when only the circuit including the first coil is closed, and a third contact mounted upon a bimetallic element approximately opposed to the other contact on said element and spaced from the contacts on said second element, said third contact being electrically connected to the first bimetallic element to short circuit the first coil upon closing with the contact on the second bimetallic element when the circuits including the second and third coils are closed.

4. An electrical system for indicating a variety of conditions on a single indicator which comprises a power source, a resistance heating coil, an indicating device, means forming a circuit from the power source through the heating coil and through the indicating device, a second power source, a second resistance heating coil, a condition sensitive device, means forming a circuit from the second power source through the second resistance heating coil and through the condition sensitive device, a third resistance heating coil, means connecting the third coil in parallel with the second coil, a second condition sensitive device in series only with the third coil, a bimetallic element associated with the first coil to be heated thereby, a second bimetallic element similarly associated with both second and third coils and with the first bimetallic element so as to be deflected in the same direction upon heating, contacts on each bimetallic element, connections including the bimetallic elements and contacts for short circuiting the first coil by closing the contacts when only the circuit including the first coil is closed, and a third contact mounted upon a bimetallic element so as to be spaced from the contact on the second bimetallic element a predetermined distance regardless of the ambient temperature, said third contact being electrically connected to the first bimetallic element to short circuit the first coil upon closing with the contact on the second bimetallic element when the circuits including the second and third coils are closed.

5. An electrical system for indicating a variety of conditions on a single indicator which comprises a power source, a resistance heating coil, an indicating device, means forming a circuit from the power source through the heating coil and the indicating device, a second power source, a second resistance heating coil, a plurality of condition sensitive devices, means forming a circuit from the second power source through the second resistance heating coil and through the plurality of condition sensitive devices, a third resistance heating coil, means connecting the third coil in parallel with the second coil, a condition sensitive switch in series only with the third coil, a bimetallic element associated with the first coil to be heated thereby, a second bimetallic element similarly associated with both the second and third coils and with the first bimetallic element so as to be deflected in the same direction upon heating, contacts on each bimetallic element, connections including the bimetallic elements and contacts for short circuiting the first coil by closing the contacts when only the circuit including the first coil is closed, and a third contact mounted upon a bimetallic element and electrically connected to the first bimetallic element and adapted to close with the contact on the second bimetallic element when both circuits including the second and third coils are closed so as to short circuit said first coil.

THEODORE W. HALLERBERG.

REFERENCES CITED

The following references are of record in the file of this patent:

UNITED STATES PATENTS

| Number | Name | Date |
| --- | --- | --- |
| 2,450,450 | Schmidinger | Oct. 5, 1948 |
| 2,519,368 | Hallerberg | Aug. 22, 1950 |